United States Patent [19]

Kobayashi

[11] Patent Number: 5,270,988
[45] Date of Patent: Dec. 14, 1993

[54] OPTICAL RECORDING AND REPRODUCING APPARATUS MAKING ACCESS BY MULTITRACK JUMP

[75] Inventor: Kazutoshi Kobayashi, Tokorozawa, Japan

[73] Assignee: Olympus Optical Co., Ltd., Tokyo, Japan

[21] Appl. No.: 15,675

[22] Filed: Feb. 9, 1993

Related U.S. Application Data

[63] Continuation of Ser. No. 752,885, Aug. 26, 1991, abandoned, which is a continuation of Ser. No. 388,461, Aug. 2, 1989, abandoned.

[30] Foreign Application Priority Data

| Aug. 8, 1988 [JP] Japan | 63-197576 |
| Aug. 19, 1988 [JP] Japan | 63-206806 |
| Aug. 19, 1988 [JP] Japan | 63-206807 |

[51] Int. Cl.⁵ .................................................. G11B 7/00
[52] U.S. Cl. ......................................... 369/32; 369/44.28
[58] Field of Search ............... 369/32, 44.28, 44.32, 369/44.25, 44.35; 360/78.04

[56] References Cited

U.S. PATENT DOCUMENTS

| 4,365,324 | 12/1982 | Michaelis | 369/44.32 |
| 4,476,555 | 10/1984 | Joichi et al. | 369/44.32 |
| 4,607,358 | 8/1986 | Maeda et al. | |
| 4,677,602 | 6/1987 | Okano et al. | 369/44.28 X |
| 4,730,290 | 3/1988 | Takasago et al. | 369/32 |
| 4,745,587 | 5/1988 | Maeda et al. | 369/32 X |
| 4,774,699 | 9/1988 | Giddings | |
| 4,819,219 | 4/1989 | Nagano | 369/44.28 |
| 4,853,913 | 8/1989 | Maeda | 369/32 |
| 4,858,214 | 8/1987 | Baba | 369/32 X |
| 4,989,190 | 1/1991 | Kuroe et al. | 369/32 |
| 5,014,256 | 5/1991 | Horie et al. | 369/44.35 |
| 5,036,506 | 7/1991 | Bierhoff | 369/44.28 |
| 5,038,333 | 8/1991 | Chow et al. | 369/44.28 |

FOREIGN PATENT DOCUMENTS

| 0289143 | 11/1988 | European Pat. Off. | 369/44.27 |
| 0294545 | 12/1988 | European Pat. Off. | 369/44.27 |
| 0304299 | 2/1989 | European Pat. Off. | 369/44.27 |
| 136040 | 7/1985 | Japan . | |
| 177640 | 8/1986 | Japan . | |
| 267938 | 11/1986 | Japan . | |
| 25411 | 5/1988 | Japan . | |

Primary Examiner—Donald E. McElheny, Jr.
Attorney, Agent, or Firm—Armstrong, Westerman, Hattori, McLeland & Naughton

[57] ABSTRACT

In the case of making a multitrack jump from the present track of a recording medium to an objective track, a light beam is moved by a jump signal, the track crossing speed of the light beam and the number of the crossed tracks are detected from a track error signal in such case and, in case the crossed track number becomes at least a value near the objective track, the track crossing speed is controlled to be below a tracking servo retractable speed so that the light beam may smoothly ground on the objective track.

14 Claims, 9 Drawing Sheets

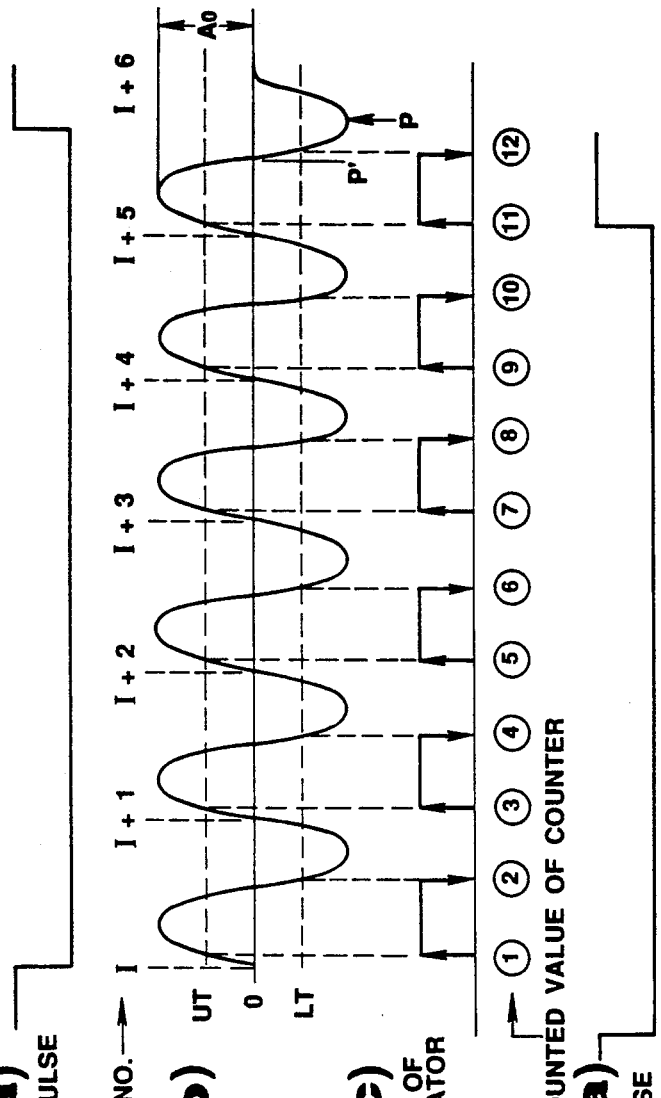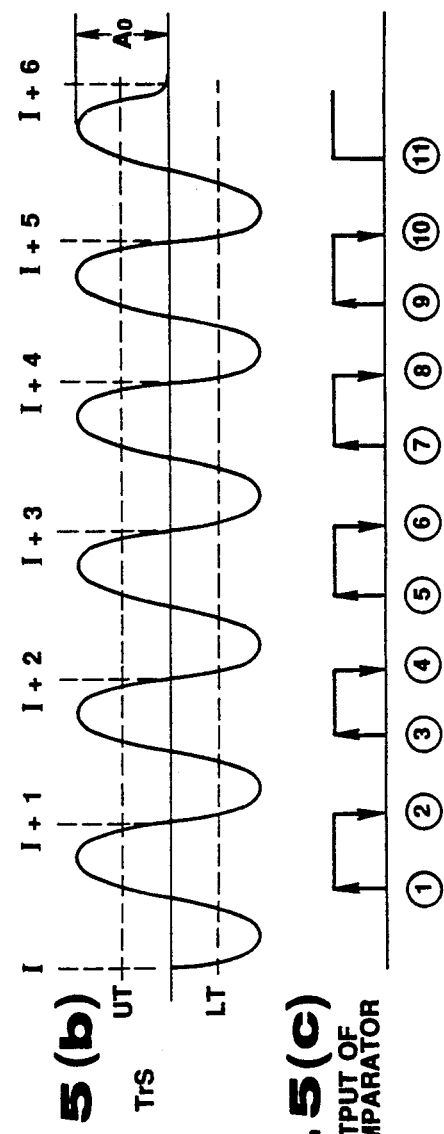

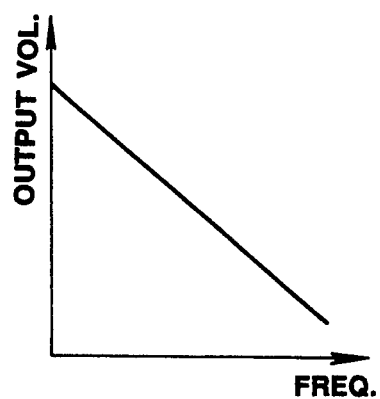
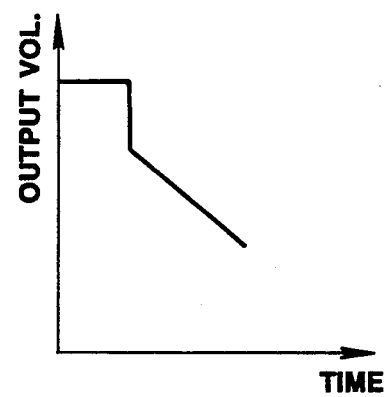
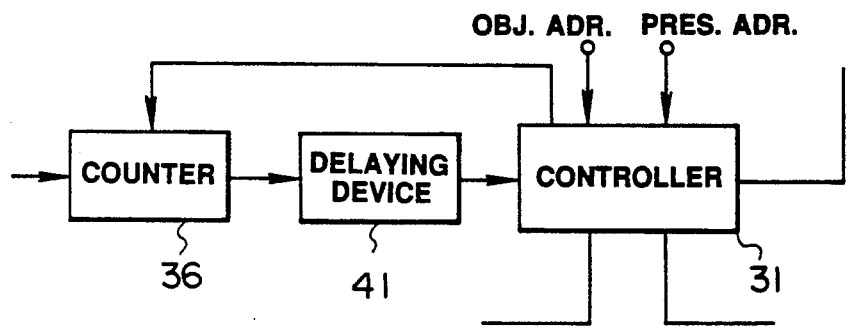
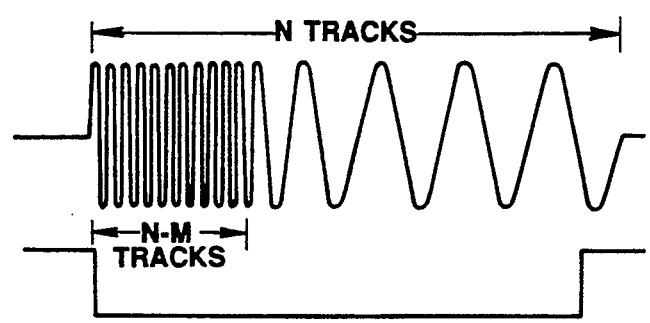
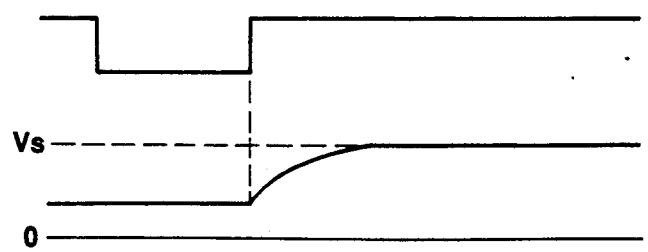

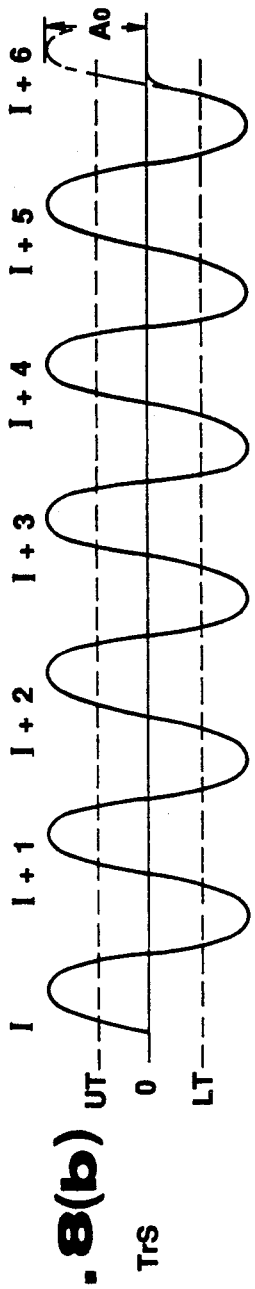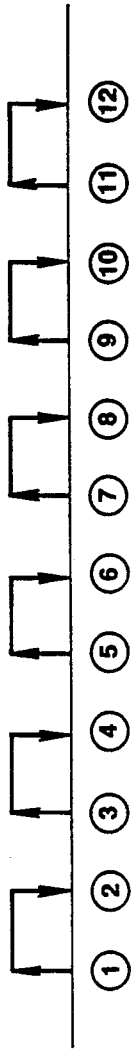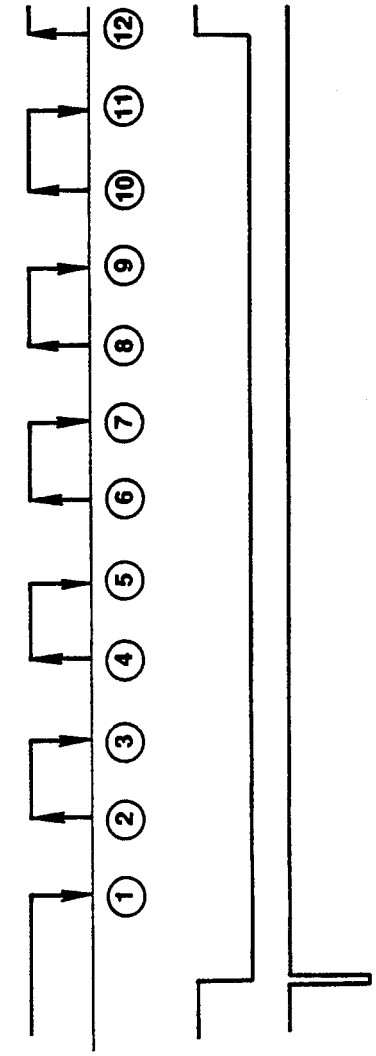
FIG.8(a) JUMP DIR.PULSE
FIG.8(b) TrS
FIG.8(c) OUTPUT OF COMPARATOR
FIG.8(d) OUTPUT OF COMP. WITHOUT RP
FIG.8(e) JUMP DIR.PULSE
FIG.8(f) RP

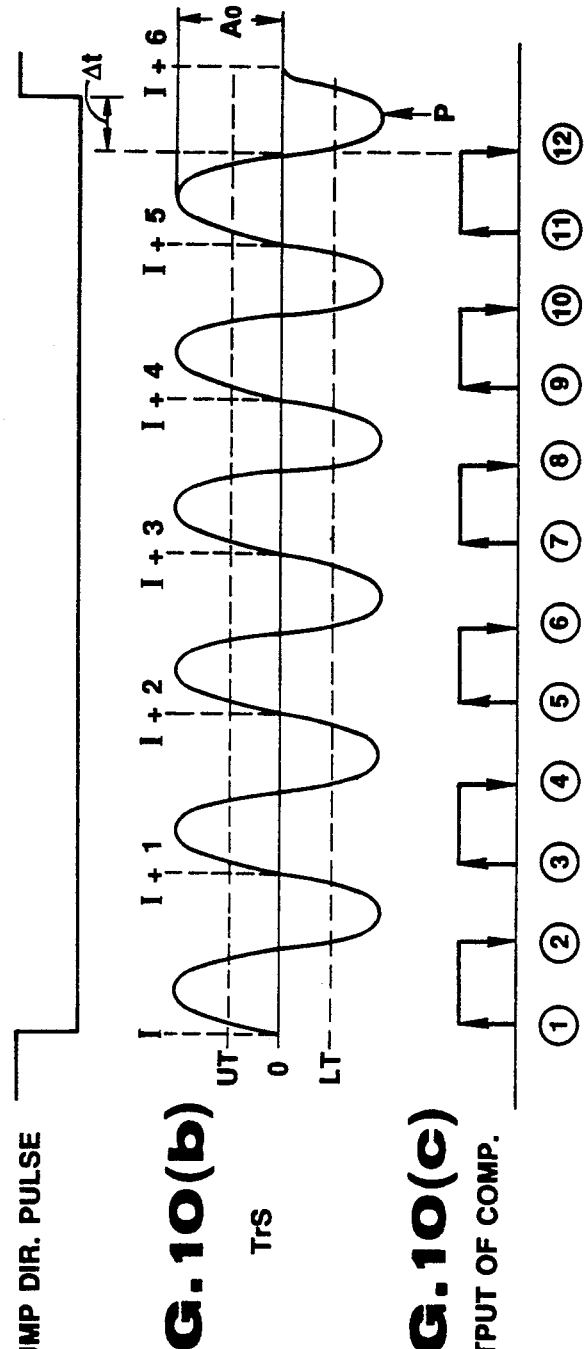
FIG. 10(a) JUMP DIR. PULSE
FIG. 10(b) TrS
FIG. 10(c) OUTPUT OF COMP.

OPTICAL RECORDING AND REPRODUCING APPARATUS MAKING ACCESS BY MULTITRACK JUMP

This application is a continuation of application Ser. No. 07/752,885 filed Aug. 26, 1991 now abandoned, which is a continuation application of Ser. No. 07/388,461 filed Aug. 2, 1989, now abandoned.

FIELD OF THE INVENTION AND RELATED ART STATEMENT

This invention relates to an optical recording and reproducing apparatus making access to an objective track by a multitrack jump.

Recently, there is an optical recording and reproducing apparatus (which shall be mentioned as a photodisc apparatus hereinafter) wherein, by condensing and radiating a light beam to an optical recording medium (which shall be mentioned as a photodisc hereinafter), a pit row or the like is formed on the photodisc to optically record information and, by receiving the light returning from the recorded pit row or the like, the recorded information can be reproduced.

In the above mentioned photodisc apparatus, the information can be recorded at a density so high that the number of tracks in which the information is recorded will be high.

Therefore, it is necessary to be able to have access to an objective track within a short time.

In a generally extensively practiced one-track jump, the jumping time is about 1 msec and, even if the photodisc is eccentric, the light beam position on the photodisc from the jump beginning time to the ending time will not vary much, therefore the relative speed between the track moving speed by the photodisc eccentricity and the beam moving speed will not vary much and a stable one-track jump will be able to be made by using an accelerating pulse and decelerating pulse.

Now, if the light beam is moved to an objective track a plurality of tracks away by jumping the tracks one by one, it will take a certain amount of time.

Therefore, in the first and second prior art examples in Japanese patent application publication No. 25411/1988 and Japanese patent application laid open No. 267938/1986, there is disclosed an access means by a multitrack jump continuously moving a plurality of tracks by one jump.

The above mentioned first prior art example has no light beam speed detecting means for making the relative speed in a predeterimined relationship. Therefore, in case the eccentricity of the photodisc is large, access to an objective track will not be able to be made by one jump.

That is to say, in order to move the light beam condensed by a condenser lens so as to be stably retracted onto the objective track, the relative speed between the track moving speed by the disc eccentricity and the beam moving speed (in other words, the actual track crossing speed including the track moving speed by the disc eccentricity) must be kept within the relative speed within the range retracted by the tracking controlling system, namely, within the fixed value.

The above mentioned first prior art example is not guaranteed to keep this relative speed within the fixed value and is therefore low in the reliability of the access operation.

On the other hand, in the second prior art example, the actual track crossing speed at the time of starting the one-track jump is detected and is controlled so as to be fixed, the reduction of the moving speed by the repulsing force of the suspension spring of the actuator is prevented and a multitrack jump is made within a short time.

However, in this second prior art example, the above mentioned crossing speed varies in response to the track moving speed by the disc eccentricity and the above described relative speed can not be held within the fixed value. Therefore, also, in this second prior art example, in case the disc eccentricity is large, the relative speed may become higher than the relative speed making the tracking retraction possible and no smooth retraction into the objective track will be able to be made after this multitrack jump.

For example, in case the disc is eccentric, if a multitrack jump is made at a fixed beam moving speed, the track error signal obtained in such case will be of such coarse and close sinusoidal wave-like waveform as is shown in FIG. 1. Here, at the time A, the track moving speed by the eccentricity of the photodisc will have the least influence on the beam moving speed or will be of a polarity reverse to that of the beam moving speed and the relative speed or actual track crossing speed will be minimum.

On the other hand, at the time b, the track moving speed by the photodisc eccentricity will be high and will have the most influence on the beam moving speed and the actual track crossing speed will be maximum. Therefore, at the time A, the track can be retracted stably after the track jump but, at the time B, even if the track is retracted, it will be very difficult to retract it to the objective track and no stabilized access will be made.

In the above mentioned second prior art example, the actual track crossing speed is detected from the track error signal at the time of starting a track jump and is controlled to be kept and therefore there is a defect that, if the state is B at the time of starting the track jump, after the track jump, no smooth access to the objective track will be substantially able to be made.

Further, in the third prior art example disclosed in Japanese patent application laid open No. 177640/1986, in the case of a track jump in the access to an objective track, a light spot is moved at a high speed to the objective track under the speed control based on a standard speed signal in response to the stroke to the objective track by a lens actuator (7) illustrated in the publication. At the time of this movement, by the output of a lens position detector (24) showing the position of a condenser lens (8) with respect to a light head housing (5), the light head (1) is controlled so that its output signal may be zero and is displaced following the movement of the condenser lens (8).

In this prior art example, the speed of the track jump by the condenser lens (8) is not substantially influenced by the eccentricity of the disc.

However, in the case of making a track jump to the vicinity of the objective track, the track crossing speed of the light beam is not controlled to be below the speed enabling the tracking retraction and therefore the tracking retraction is likely to fail.

Also, in the case of making a track jump to the vicinity of the objective track, when an external vibration is applied, the tracking retraction will be likely to fail.

Further, in Japanese patent application laid open No. 136040/1985, the same technical contents as of this third prior art example are disclosed. Therefore, also, in this publication, there is the same defect.

OBJECTS AND SUMMARY OF THE INVENTION

An object of the present invention is to provide an optical recording and reproducing apparatus wherein access can be made positively to an objective track by a multitrack jump.

Another object of the present invention is to provide an optical recording and reproducing apparatus wherein access can be made to an objective track within a short time.

Further another object of the present invention is to provide an optical recording and reproducing apparatus wherein, even in case the number of track crossing lines is high, access will be able to be made by one track jump.

In the present invention, in the case of making a multitrack jump from the present track to an objective track, a jump signal is applied to a beam moving means for moving a light beam, the track crossing speed of the light beam and the number of the crossed tracks are detected from a track position movement signal of this jump signal applying period and, in case the number of the crossed tracks becomes at least a value near the objective track, by a grounding speed limiting means, the track crossing speed will be limited to be below the value enabling the track retraction, then the signal applied to the beam moving means will be switched to a negative feedback track position movement signal from the jump signal and access to the objective track will be made. Also, the timing of this switching is made from one track before the objective track to after the lapse of about ¾ of the time anticipated to cross the objective track so that the grounding on the objective track may be smoothly made.

BRIEF DESCRIPTION OF THE DRAWINGS

FIGS. 2 to 8(f) relate to the first embodiment of the present invention.

FIG. 2 is a formation diagram of a track access means in the first embodiment.

FIG. 3 is a general formation diagram of the first embodiment.

FIGS. 4(a)–4(c) are an explanatory diagram of the case that a multitrack jump is made on the inner peripheral side.

FIGS. 5(a)–5(c) are an explanatory diagram of the case that a multitrack jump is made on the outer peripheral side.

FIG. 6 is a circuit diagram of a comparator of hysterisis characteristics.

FIGS. 7(a) and 7(b) show diagrams showing characteristics of an F/V converter.

FIGS. 8(a)–8(f) are an explanatory diagram of the case that a track jump is made on the outer peripheral side and then on the inner peripheral side.

FIG. 9 is a formation diagram showing an essential part of the second embodiment.

FIGS. 10(a)–10(c) are an operation explaining diagram of the second embodiment.

FIGS. 12(a)–12(d) are an operation explaining diagram of the third embodiment.

DETAILED DESCRIPTION OF THE PREFERRED EMBODIMENTS

Figure 1:
FIG. 1 is a waveform diagram showing a track error signal in case there is an eccentricity.
Figure 3:
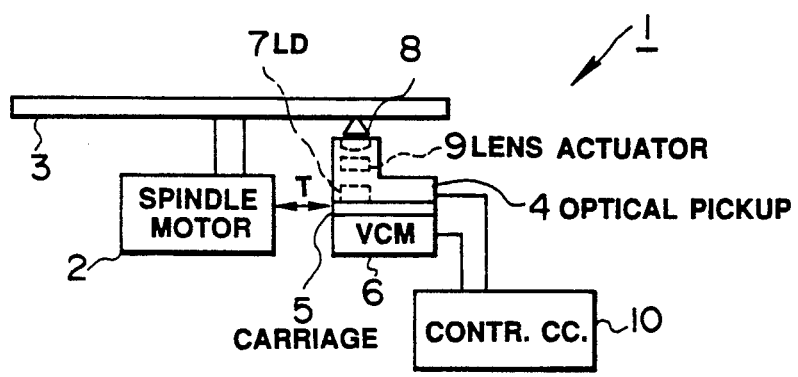

As shown in FIG. 3, in an optical recording and reproducing apparatus (photodisc apparatus) 1 of the first embodiment, an optical pickup 4 is arranged as opposed to a photodisc 3 rotated and driven by a spindle motor 2, is fitted to a carriage 5 and is made movable in the radial direction of the photodisc 3, that is, in the direction T crossing vertically the concentric or spiral tracks of the photodisc 3 by such pickup moving means as a voice coil motor (abbeviated as VCM) 6

In the above mentioned optical pickup 4, a laser diode 7 is contained as a light beam generating means so that a light beam generated by this laser diode 7 may be condensed through an objective lens 8 and may be radiated as a beam spot to the photodisc 3. When a driving current is applied to a lens actuator 9 through a control circuit 10, this objective lens 8 will be movable in the direction T crossing the tracks of the photodisc 3 and the direction vertical to the surface of the photodisc 3. For example, when a driving current is fed to a tracking actuator forming the (lens) actuator 9, the objective lens 8 will be able to be moved in the track crossing direction T of the photodisc 3. Also, by operating a tracking controlling system using a track error signal produced by receiving the light returning from the photodisc 3, the present track can be traced.

On the other hand, when a focus controlling system using a focus error signal is operated on a focusing actuator forming the lens actuator 9, the distance between the objective lens 8 and photodisc 3 will be able to be held in the distance making the focused state.

Figure 2:
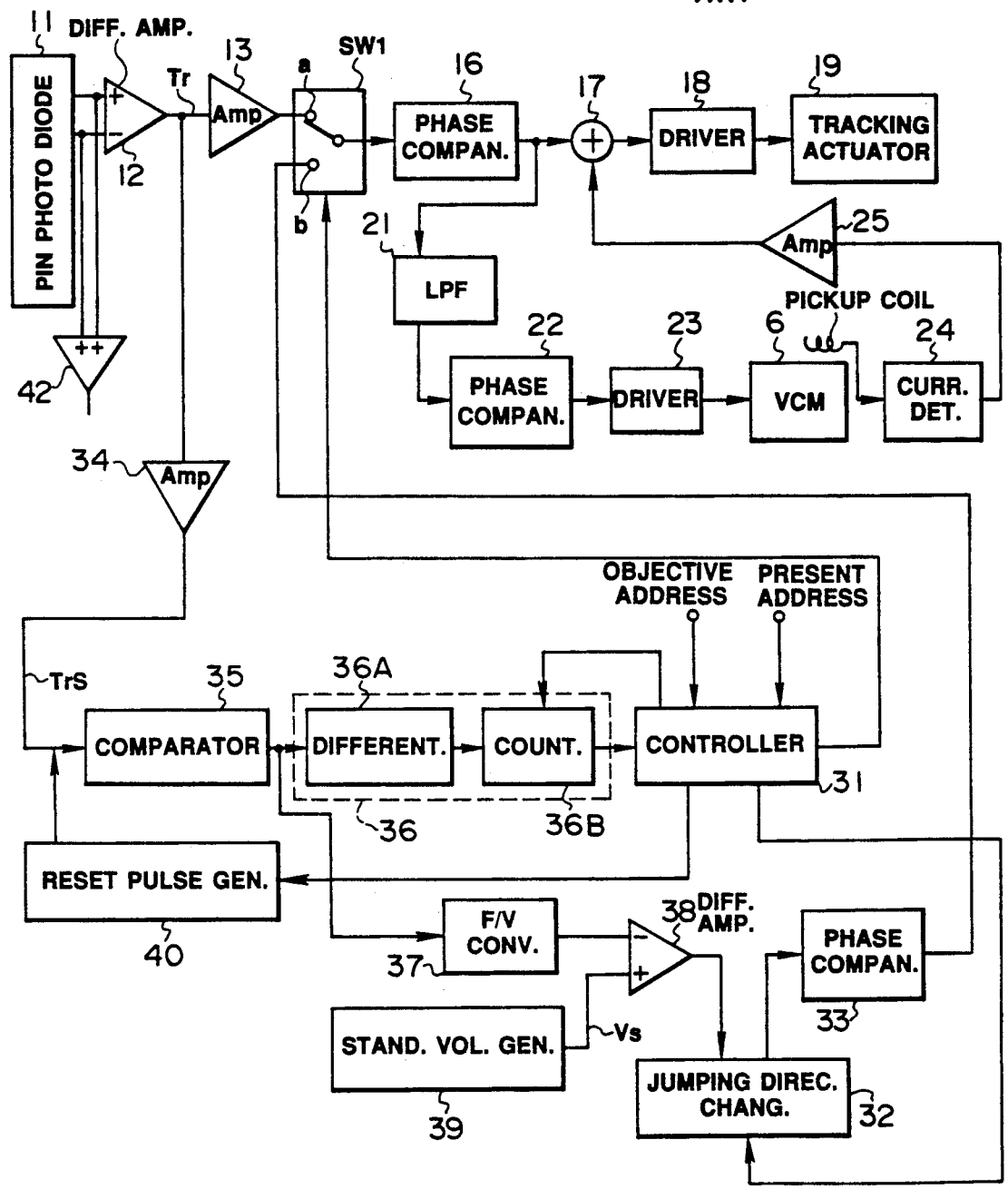

Now, in case information is recorded or reproduced in any track by the above mentioned apparatus, it will be necessary to make access to the objective track from the present track. In this embodiment, there is a track access means by a multitrack jump and the formation of its control system is shown in FIG. 2.

The light radiated from the laser diode 7 and returning from the photodisc 3 is received by a pin photodiode 11 forming a 4-divided detector or the like and is photoelectrically converted and then the output is passed through a differential amplifier 12 to produce a track error signal Tr which is input into a switch SW1 through an amplifier 13. By the way, the output of the pin photodiode 11 is added in an adder 10 to produce a reproduced signal.

The signal through the contact a of the above mentioned switch SW1 is compensated in the phase through a phase compensating circuit 16 and is then fed to a tracking actuator (briefly mentioned as a Tr actuator hereinafter) 19 through an adder 17 and driver 18 so that the tracking may be set in the controlled state and the condensed light beam may be made to trace the present track by the objective lens 8. In such case, the signal through the above mentioned phase compensating circuit 16 is fed to the VCM through a low pass filter 21, phase compensating circuit 22 and driver 23 to control this VCM 6 with a track error signal Tr. The driving current fed to this VCM 6 is detected by a current detecting circuit 24, is amplified by an amplifier 25 and is then input into the above mentioned adder 17. Therefore, the above mentioned track error signal Tr is used for the control of moving the objective lens 8 to trace the objective track and for the control of the entire movement (coarse movement) of the optical pickup by the VCM.

That is to say, with the tracking control by using only the objective lens 8 (Tr actuator 19), in case the eccentricity of the photodisc 3 is large, the tracking may be difficult in the movable range of only the Tr actuator. Therefore, the signal on the low band side in the track error signal Tr is fed to the VCM 6 so that the VCM 6 may be driven in response to the track movement by the eccentricity of the photodisc 3 and the entire optical pickup 4 may be moved to absorb the influence of the photodisc eccentricity. Also, in case the VCM 6 moves, its acceleration is detected by a current detecting circuit 24 using a Pickup coil or the like and is partly superimposed on the signal driving the Tr actuator 19 and the objective lens 8 is also moved with the movement of the VCM 6 to inhibit a relative acceleration from being produced between the VCM 6 and objective lens 8, to prevent the objective lens 8 from vibrating and to make a smooth tracking control.

By the two-step tracking control with the above mentioned Tr actuator 19 and VCM 6, even in case the eccentricity of the photodisc 3 is large, the tracking will be able to be held in a controlled state by keeping the objective lens 8 in the moving range only near the substantially equibrated position.

Now, in the case of making access to the objective track from the present track, access can be made to the objective track within a short time by a multitrack jump.

In the case of making this multitrack jump, a controller 31 will output to the above mentioned switch SW1 a jump directing pulse itself shown in FIG. 4a (or FIG. 5a) or a switching signal synchronized with it to switch the contact b side on.

The above mentioned controller 31 operates on the difference between the address of the present track (which is decoded from the output of the address 42) and the address of the objective track, determines by the positive or negative sign whether to jump to the inner peripheral side track or to the outer peripheral side and controls the switching of the jump direction switching circuit 32.

That is to say, the polarity of the driving signal for the multitrack jump is changed in response to either direction. On the basis of the jump pulse directing pulse shown in FIG. 4a (or 5a), the controller 31 feeds through the jump direction switching circuit 32, phase compensating circuit 33, switch SW1 and phase compensating circuit 16 a jump driving signal to the Tr actuator 19 on one hand through the adder 17 and driver 18 and a driving signal to the VCM 6 on the other hand through the LPF 21, phase compensating circuit 22 and driver 23.

The same as in the case of the above described tracking control, a part of the driving signal of this VCM 6 is input into the adder 17 through the current detecting circuit 24 and amplifier 25 to Produce in the objective lens 8 the same acceleration as the acceleration generated in the VCM 6 to make a track jump. The eccentricity of the photodisc 3 is considered to exist at the time of the track jump and its influence can be dissolved by moving the VCM 6. Even in case the number of tracks crossed in the case of the multitrack jump is high, the multitrack jump will be able to be made without being influenced by the movable range of the Tr actuator 19.

For example, in case a light beam is moved by the Tr actuator 19 from a position near the equebrated position, when the movement quantity becomes large, such resilient member as a spring forming the Tr actuator 19 and movably holding the objective lens 8 will reach its resiliency limit the movement quantity of the objective lens for the driving current will not be constant and the tracing response will be anticipated to vary. The jump to the objective track may not be made and may have to be suspended on the way. On the other hand, as in this embodiment, when the VCM 6 is moved as operatively connected, such defect will be able to be dissolved.

Figure 6:
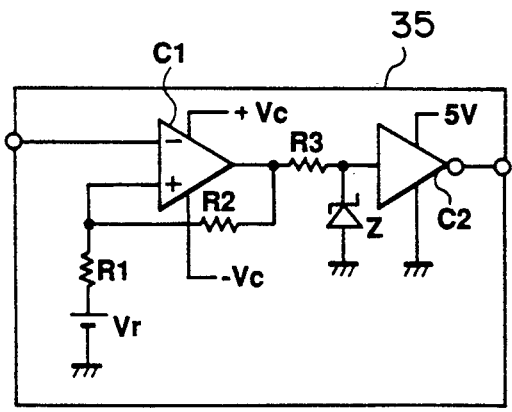

At the time of the multitrack jump of the objective lens 8 while the above mentioned VCM 6 is also moved, the output signal of the differential amplifier 12 is input into the comparator 35 through the amplifying amplifier 34. The track error signal in the case of passing through this amplifier 34 will be an S-shaped waveform signal (represented by TrS) as shown in FIG. 4b (or FIG. 5b). This signal TrS is shaped in the waveform by the comparator 35 to be a 2-valued square wave as shown in FIG. 4c (or FIG. 5c). This comparator 35 forms a hysteresis comparator having hysteresis levels UT and LT as shown by the broken lines in FIG. 4b (or FIG. 5b). With the hysteresis level UT (or LT) of a size which is ⅓ to ⅔ of the amplitude Ao of this signal TrS, the influence of the noise is made as small as possible. That is to say, the hysteresis level is made deep to prevent a mis-count. This hysteresis comparator is so formed as to make a positive feedback from the output end of an OP amplifier C1 to the non-inverted input end as shown in FIG. 6. By the way, the level Vr in series with the resistance R1 is a level slightly larger than 0. In this case, by the positive feedback, against the input signal of a level not exceeding the level $UT = Vr + VHR1/(R1+R2) - VHR1/(R1+R2)$ (where VH represents a voltage level at "H" in the OP amplifier C1), the output of the OP amplifier C1 will be "H" and will be inverted to be "L" by an inverter C2 provided on the output side.

Against the input signal of the level exceeding the above mentioned UT, the output of the OP amplifier C1 is "L" and the output of the inverter C2 is "H". By this inversion, the OP amplifier C1 having made the positive feedback of this output will hold "L" until an input signal below the level $LT - -VLR1/(R1+R2)$ (where $-VT$ represents a voltage level at "L"). By the way, a Zener diode Z provided on the output side of the OP amplifier C1 is to make the 2-valued output convertible, for example, with the TTL or the like (to convert (clamp) the input level to the inverter C2 to the 0 level).

The output of the above mentioned comparator 35 is input into a counter circuit 36 consisting of a differential circuit 36A and counter 36B to count the rising edges and falling edges of the 2-valued pulse, is input into a frequency/voltage (F/V) converter 36 and is converted to the voltage of a level in response to the frequency.

In the above mentioned counter circuit 36, the count value corresponding to the number of jumped tracks is preset in making a multitrack jump with the controller 31 so that, when this preset value is reached, it will be known to the controller that the predetermined number of tracks have been jumped.

On the other hand, the converted output signal of the above mentioned F/V converter 37 is input into the differential amplifier 38 and is compared with the standard voltage of the standard voltage generator 39 and the differential output component is added to the jump direction switching circuit 32. By the way, the input and output characteristics (F-V conversion characteristics) of the above mentioned F/V converter 37 are shown in FIG. 7a. In this embodiment, the F-V conversion characteristics are made negative characteristics in which, the lower the frequency, the larger the converted voltage level so as to be also of a function of a kick pulse generating circuit. That is to say, if the controller 31 sets the polarity of the jump direction switching circuit 32 at the time of starting a multitrack jump, the level of the converted voltage of the F/V converter 37 will become a maximum level at the starting time. As shown in FIG. 7b, the converted voltage at the starting time is fed as a track jumping driving signal to the Tr actuator 19 and VCM 6 side through the differential amplifier 38 and jump direction switching circuit 32. (Instead of the combined use, the driving signal may be output from the controller 31.).

By the way, it is natural that the size of this driving signal must be made larger than the maximum value of the track moving speed by the eccentricity of the photodisc 3.

In the above mentioned standard voltage generator 30, after the multitrack jump, in case the tracking controlling mode is switched on to make access to the objective track, a standard voltage Vs corresponding to the vicinity of the maximum value of the track crossing speed which can stably retract the beam to the objective track but to the crossing speed not exceeding this maximum value will be generated. (Here, the maximum value of this track crossing speed is represented by a voltage level converted by the above mentioned F/V converter 37.) That is to say, in the case of a multitrack jump, if the output of the F/V converter 37 is kept near this standard voltage Vs, the track will be able to be positively retracted.

After a multitrack jump is started, the objective lens 8 or the like will move and, in response to the eccentricity of the photodisc 3, the moving speed of the objective lens 8 and the moving speed of the VCM 6, the output level of the F/V converter 37 will vary. The difference between this output level and the standard voltage Vs level 39 is detected by the differential amplifier 38. In case there is a difference from the level of this standard voltage Vs, the level difference will be controlled to be zero by a feedback loop. The actual track crossing speed is held at a speed corresponding to this standard voltage Vs.

Now, in order to stably retract the track to the objective track, before crossing the objective track, a tracking servo state is switched on to retract it to the objective track. In this case, it is preferable as a timing for setting the tracking servo state that the point which the track error signal zero crosses after the timing corresponds to the objective track.

This manner shall be explained in the following with reference to FIGS. 4(a)-5(c).

FIG. 4b shows a track error signal TrS in case a multitrack jump (a 6-track jump in this diagram) is made on the inner peripheral side.

In this case, there is shown a manner in which the present track makes at I a multitrack jump to an objective track (I+6) track. The cross points of the actual tracks I, I+1, I+2, ... in FIG. 4b are zero cross points in the right rising waveform parts.

These track error signals TrS are counted as shown in FIG. 4c. From a point P at which the track error signals TrS reach a negative peak after 12 (2N in the general case) which are twice as many as the difference 6 (N in the general case) until the objective track are counted, that is, from the part ¼ wavelength before the objective track (I+6), a servo retractable range starts.

Therefore, the counter circuit 36 counts the rising and falling edges of the signals 2-valuing the track error signals by twice the number of the tracks until the objective track and then outputs to the controller 31 the signal having multitrack-jumped the predetermined number of tracks and the controller 31 receives it, releases the track jumping directing pulse and switches the switch SW1 to the tracking servo mode on which the contact a is switched.

From the output of the above mentioned counter circuit 36 until the controller 31 switches the switch SW1, there is a slight time delay. The timing when the switch SW1 becomes the tracking servo mode is after the point P in FIG. 4b by this delay. (That is to say, ¼ wavelength before, the track is retracted.) Therefore, by this switching to the tracking servo mode, the track error signals TrS having negatively fed back the track position movement can be stably retracted into the zero crossing position, that is, the objective track.

By the way, the second reason why the hysteresis of the above mentioned comparator 35 is made large is that the time when the counter circuit 36 has made a predetermined number of counts can be set closely enough to the time retractable into the objective track. (The mere zero cross is further ¼ wavelength before the tracking servo retractable range (as shown by P' in FIG. 4b) and, when the tracking servo mode is immediately switched, the beam will not be able to be retracted into the objective track in some case.)

That is to say, in case the track jump is made in the inner peripheral direction, the right rising part will be a track retractable area and the right falling part will be an inverse characteristic area. Therefore, when the hysteresis is made deeper, when the counts reach the predetermined number and the jump driving signal is suspended, as the track retractable area has been approached, the beam will be able to be stably retracted. (Reversely speaking, the escape from the inverse characteristic area becomes easy.)

On the other hand, in the case of the outer peripheral direction movement, contrary to the case of the inner peripheral direction movement, the right falling part will be a track retracting area. In this case, too, the operation will be made on the same hysteresis level and the signal on the track will be output still ¼ wavelength before. (The tracking servo mode is switched.)

In the case of this outer peripheral direction movement, the comparator 35 will not operate for the track error signal of the first half wavelength (with this half wavelength, the level UT will not be exceeded) and therefore no 2-valuing pulse will appear. Therefore, the timing of stopping the jump is carried out after the count of 2N−1, that is, one less. (For example, the preset value of the counter 36 from the controller 31 may be set at 2N in the case of the inner peripheral side movement and at 2N−1 in the case of the outer peripheral side movement.)

Now, after the jump on the outer peripheral side to the objective track, the output of the comparator 35 will be "H". If the track jump in the inner peripheral direction is made as it is with the next jump direction, as shown in FIG. 8d, after 12 (2N in the general case) counts, the jump directing pulse will be released as shown in FIG. 8e, therefore an on-track direction will be output in the inverse characteristic part of the track error signal TrS, the likelihood of the failure of the on-track (in this case, as shown by the one-point chain line in FIG. 8(f) will be high and the jump number precision will deteriorate. Therefore, in this embodiment, a resetting pulse generating circuit 40 is provided as shown in FIGS. 8(a)-8(f), the falling part at the starting time point of the jump directing pulse is differentiated to produce a pulse RP shown in FIG. 8f, this pulse RP is applied to the input end of the comparator 35 so that the output of the comparator 35 may be "L" and then, when the track error signal TrS exceeds the level UT, "H" will be able to be detected.

According to the above mentioned first embodiment, in case a multitrack jump is to be made, the track error signal TrS is 2-valued, a multitrack jump is made until ¼ wavelength before the objective track, the frequency of the track error signal in such case is detected (including the eccentricity of the photodisc) to detect the actual track crossing speed and such moving speed (crossing speed) controlling means as makes the crossing speed a servo-retractable fixed speed is formed. By this moving speed controlling means, even in case the photodisc is eccentric, the eccentricity will be compensated and a fixed crossing speed will be able to be retained. As this crossing speed is a track retractable speed, in case the jump direction is released and the track servo mode is switched on, a stabilized track retraction will be able to be made. Thus, information can be recorded in the objective track and the information recorded in the objective track can be reproduced.

FIG. 9 shows an essential part of the second embodiment of the present invention. In this embodiment, in the first embodiment shown in FIG. 2, the output of the counter circuit 36 is input into the controller 31 through a delaying device 41.

That is to say, in the above mentioned first embodiment, the output of the counter circuit 36 having counted a predetermined number (preset number) is input into the controller 31 and the controller 31 receives it, suspends the jump directing signal and makes a servo retraction, whereas, in this embodiment, a predetermined number is counted by the counter circuit 36 and is input into the controller 31 after a predetermined delay time Δt by the delaying device and then the controller 31 suspends the jump directing pulse (that is, controls the switch SW1 to be on/off).

The operation in this case will be as shown in FIGS. 10(a)-10(c).

By making the above mentioned delay, it is possible to switch on the tracking servo within the track retracting area, that is, in the part nearer than ¼ wavelength before the designated track.

In this embodiment, the output of the counter circuit 36 is delayed but the signal switching the switch SW1 by the controller 31 may be delayed.

Figure 11:
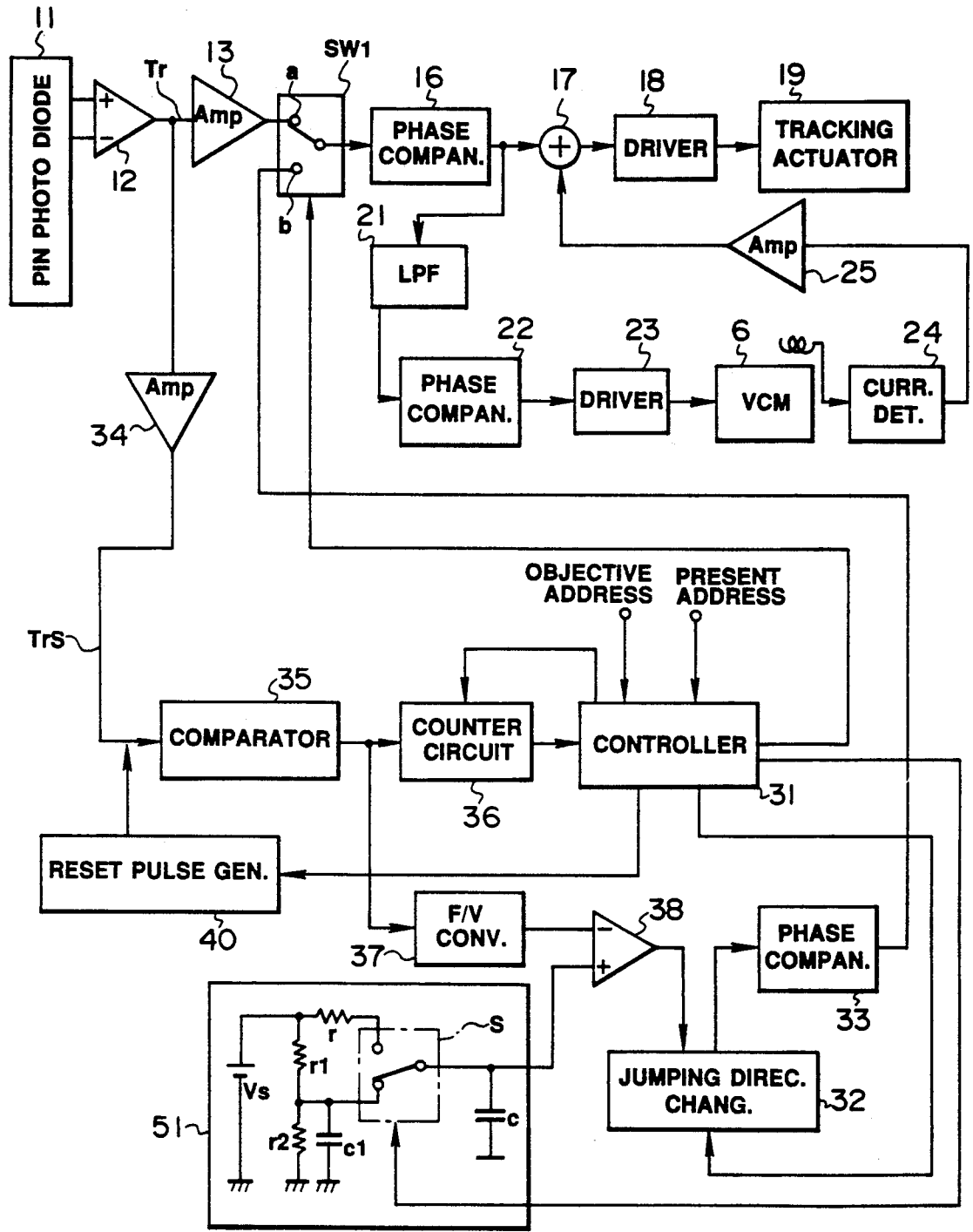
FIG. 11 is a formation diagram of a track access means in the third embodiment of the present invention.
Figure 13:
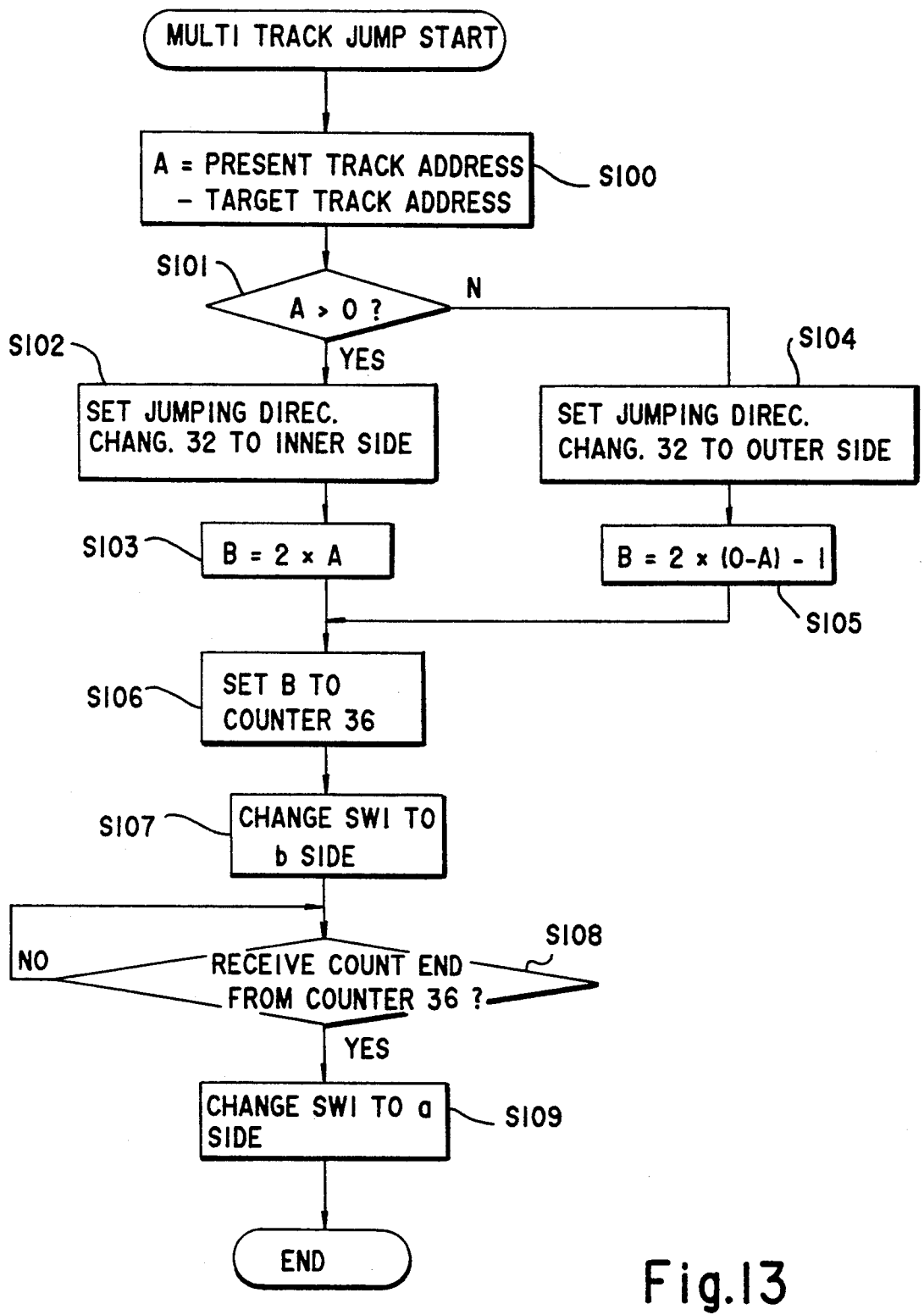
FIGS. 13 and 14 are flowcharts depicting the operation of the embodiments of FIGS. 2 and 11 respectively.
Figure 14:
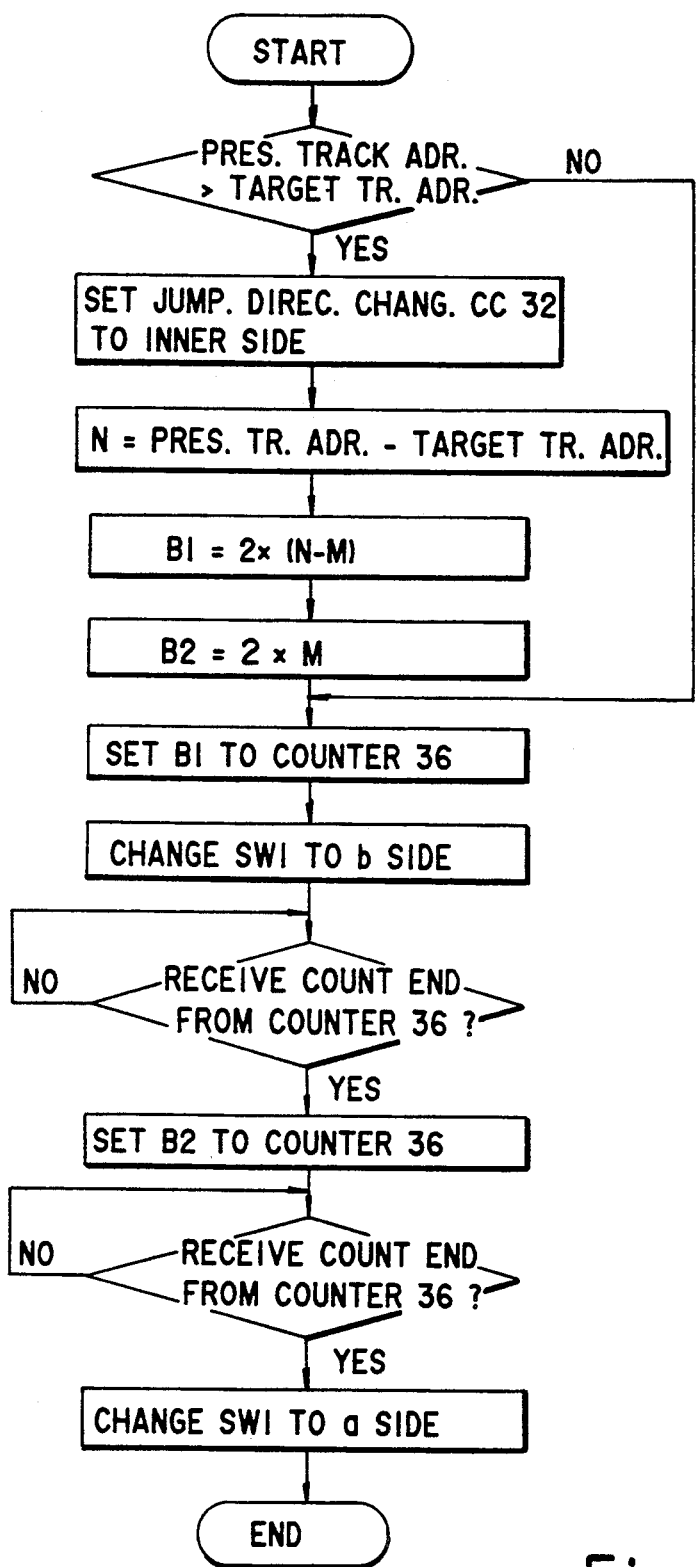

FIG. 11 shows a control system of the third embodiment of the present invention.

In this embodiment, in the first embodiment shown in FIG. 2, a standard voltage setting circuit 51 in which the output voltage is variable by a control signal from the controller 31 is used in place of the standard voltage generator 39.

In the above mentioned standard voltage setting circuit 51, in the case of making a multitrack jump, the standard voltage is set to be low so that the relative speed may be high until M tracks before the objective (designated) track (See FIG. 12d) and is then switched to a high standard voltage Vs so that the relative speed may be low.

According to this embodiment, in case N−M tracks which are N tracks expected to be moved less M tracks are counted, the standard voltage setting circuit 51 will be set at a high standard voltage Vs. As shown in FIG. 11, this circuit 51 can be simply formed of a standard voltage source Vs, resistances r1, r2 and r, capacitors c1 and c and a switch S.

Therefore, in case a multitrack jump is made, as shown in FIG. 12a, the track error signal TrS will be moved at a high moving speed to the N−M tracks and will then be switched to a high standard voltage Vs for example, at a time constant rc, therefore the moving speed will be braked, the speed will be gradually reduced, a predetermined moving speed will be reached and then on-track will be made.

According to this embodiment, access to an objective track is possible within a short time.

By the way, the above mentioned standard voltage setting circuit 51 may be switched in response to the number of tracks to be multitrack-jumped. For example, in case the number of crossed tracks is large, the standard voltage will be made low, a track jump will be made at a high speed, the standard voltage will be made high so that a track retraction in the later half part may be possible and the tracks will be crossed at a low speed. In case the number of the crossed tracks is small, the tracks will be crossed at a low speed at which the track retraction is possible from the first. Further, in the case of a medium number of the crossed tracks, the tracks may be crossed at a medium speed (or high speed) under a medium standard voltage and the beam may be retracted at a low speed.

By the way, in the above mentioned respective embodiments, in the case of making a multitrack jump, the VCM 6 is also operated. However, the present invention is not limited to this and, during the multitrack jump, the VCM 6 may not be operated. (For example, in FIG. 2 or 11, the input to the LPF 21 is made off. Also, as required, the output of the amplifier 25 is not added to the adder 17.)

In such case, the movable range in which a multitrack jump can be made will become narrow but will be practical enough. Also, the operation/non-operation of the VCM 6 may be selected in response to the number of the crossed tracks.

As described above, according to the present invention, in the case of jumping tracks, the frequency of the track error signal detected during the track jumping is detected, at least in the vicinity reaching a predetermined number of tracks, the frequency, that is, the actual track crossing speed is controlled to be below the speed making the track retraction possible and therefore the track retraction after jumping a predetermined number of tracks can be positively made.

Different embodiments can be formed by combining the above described respective embodiments.

What is claimed is:

1. A track access controlling apparatus, comprising:
   a beam generating means for generating a light beam;
   a beam projecting means for projecting said light beam toward a recording medium onto a track at a present address;
   a position movement detecting means for detecting a position movement signal with periodicity indicating a position movement in a direction in which said projected light beam intersects at right angles with a track of said recording medium, and for outputting a track error signal;

amplifying means for amplifying said track error signal and outputting an amplified track error signal;

control means for outputting a jump direction control signal representing a selected jump direction and a jump directing signal representing a jump from a current track to which said light beam is being projected to an objective track placed apart from the current track at intervals of a predetermined number of tracks N;

jumping direction change means receiving said jump direction control signal, for outputting a jump driving signal;

switching means controlled by said jump directing signal from said control means, for selectively receiving either said amplified track error signal or said jump driving signal and supplying it as an output;

driving means receiving the output from said switching means, for producing a track jumping driving signal;

a beam moving means for moving said light beam in a direction intersecting at right angles with said track in response to said track jumping driving signal;

a hysteresis comparator means converting said track error signal output from said position movement detecting means into a binary signal by comparing said track error signal with a hysteresis signal having a predetermined signal level;

a counting means for counting a number of pulses of said binary signal and outputting a count signal corresponding to the number of pulses of said binary signal; and said switching means switching between said jump signal to said amplified track error signal when only a number equal to 2N or 2N−1 is counted by said counting means in accordance with a jumping direction at the time of jumping.

2. A track access controlling apparatus according to claim 1, further comprising crossed track number detecting means for detecting a crossed track number, and wherein said switching means has a switching timing controlling means for switching at a time equal to approximately three-fourths of a track crossing time anticipated to be required to cross a next track at a crossing speed from a time when said crossed track number indicates one track before said objective track to said time has elapsed.

3. A track access controlling apparatus according to claim 2 wherein said switching timing controlling means is formed of a delaying means.

4. A track access controlling apparatus according to claim 1 or 2, further comprising speed limiting means and crossed track number detecting means, wherein said speed limiting means has a high speed crossing controlling means for controlling high speed crossing of said light beam at a crossing speed exceeding a fixed value during the period in which a crossed track number detected by said crossed track number detecting means is not judged to have reached said objective track.

5. A track access controlling apparatus according to claim 1 or 2 wherein said beam moving means is formed of a lens actuator for moving an objective lens and a pickup moving means for moving an optical pickup provided with said objective lens and said lens actuator.

6. A track access controlling apparatus according to claim 5 wherein a pickup moving means is simultaneously driven by a signal representing current driving said lens actuator.

7. A track access controlling apparatus according to claim 1, further comprising a track crossing speed detecting means for detecting a crossing speed at which said light beam crosses the tracks in response to said position movement signal during a period in which said jump directing signal is output to said beam moving means; wherein said track crossing speed detecting means has a comparator provided with hysteresis characteristics of said position movement signal during the period in which said jump directing signal is output to said beam moving means, and a counter means for counting the output of said comparator.

8. A track access controlling apparatus according to claim 7 wherein said counter means is formed of a differential circuit for differentiating the output of said comparator and a counter for counting the output of said differential circuit.

9. A track access controlling apparatus according to claim 11, wherein said speed limiting means comprises a frequency/voltage converting means for converting the frequency of the output signal of said crossed track number detecting means to a voltage, a standard voltage generating means for generating a standard voltage determining said crossing speed and a differential amplifying means for outputting an error signal corresponding to the position movement from said standard voltage of the voltage converted by said frequency/voltage converting means.

10. A track access controlling apparatus according to claim 9 wherein, in said standard voltage generating means, the value of said standard voltage is controlled by the output signal of said crossed track number detecting means.

11. A track access controlling apparatus, comprising:

a beam generating means for generating a light beam;

a beam projecting means for projecting said light beam toward a recording medium onto a track at a present address;

a position movement detecting means for detecting a position movement signal with periodicity indicating a position movement in a direction in which said projecting light beam intersects at right angles with a track of said recording medium, said position movement detecting means outputting a detecting signal, and for outputting a track error signal;

amplifying means for amplifying said track error signal and outputting an amplified track error signal;

control means for outputting a jump direction control signal representing a selected jump direction and a jump directing signal representing a jump from a current track to which said light beam is being projected to an objective track placed apart from the current track at intervals of a predetermined number of tracks N;

jumping direction change means receiving said jump direction control signal, for outputting a jump driving signal;

switching means controlled by said jump directing signal from said control means, for selectively receiving either said amplified track error signal or said jump driving signal and supplying it as an output;

driving means receiving the output from said switching means, for producing a track jumping driving signal;

a beam moving means for moving said light beam in a direction intersecting at right angles with said track in response to said track jumping driving signal;

a hysteresis comparator means converting said track error signal output from said position movement detecting means into a binary signal by comparing said track error signal with a hysteresis signal having a predetermined signal level;

a track crossing speed detecting means for detecting a crossing speed at which said light beam crosses the tracks in response to said position movement signal during a period in which said jump directing signal is output to said beam moving means;

a counting means for counting a number of pulses of said binary signal, for detecting the number of tracks crossed by said light beam from said position movement signal during said period and outputting a count signal corresponding to the number of pulses of said binary signal; and a switching controlling means for retracting said light beam to a nearest track so that said position movement signal has a value of zero by switching between said jump driving signal to said amplified track error signal when only a number equal to 2N or 2N−1 is counted by said counting means in accordance with a jumping direction at the time of jumping; and a speed limiting means for directing on said objective track the light beam switched by said switching means by limiting the size of said jump signal to said beam moving means so that said crossing speed is below a fixed value when said number of pulses counted by said counting means representing the number of crossed tracks has reached a predetermined number.

12. A track access controlling apparatus according to claim 11 wherein said switching controlling means has a switching timing controlling means for switching at a time equal to approximately three-fourths of a track crossing time anticipated to be required to cross a next track at said crossing speed from a time when said crossed track number indicates one track before said objective track to said time has elapsed.

13. A track access controlling apparatus according to claim 11 wherein said speed limiting means has a high speed crossing controlling means for controlling high speed crossing of said light beam at a crossing speed exceeding said fixed value during the period in which said crossed track number detected by said crossed track number detecting means is not judged to have reached said set track number.

14. A track access controlling apparatus according to claim 13, further comprising pickup moving means which are simultaneously driven by a signal representing current driving said beam moving means.

* * * * *